US012737772B2

(12) United States Patent
Alyousef et al.

(10) Patent No.: US 12,737,772 B2
(45) Date of Patent: Sep. 15, 2026

(54) SYSTEMS AND METHODS OF A SERVER PROBE FOR COMPLIANCE DEPLOYMENT CHECKS

(71) Applicant: WELLS FARGO BANK, N.A., San Francisco, CA (US)

(72) Inventors: Bashar Alyousef, Broomfield, CO (US); Debasis Dash, Bangalore (IN); Jonathan Dobson, Westminster, CO (US); Cheri Williams, Lafayette, CO (US); Tae Chang, Boulder, CO (US); Ben Brock, Jr., Silver Spring, MD (US)

(73) Assignee: Wells Fargo Bank, N.A., San Francisco, CA (US)

( * ) Notice: Subject to any disclaimer, the term of this patent is extended or adjusted under 35 U.S.C. 154(b) by 175 days.

(21) Appl. No.: 18/504,285

(22) Filed: Nov. 8, 2023

(65) Prior Publication Data

US 2025/0148480 A1 May 8, 2025

(51) Int. Cl.

*G06F 15/173* (2006.01)
*G06F 11/30* (2006.01)
*G06F 15/16* (2006.01)
*G06Q 30/018* (2023.01)

(52) U.S. Cl.

CPC ....... *G06Q 30/018* (2013.01); *G06F 11/3089* (2013.01)

(58) Field of Classification Search

CPC .............. G06Q 30/018; G06Q 30/0185; G06F 11/3089; G06F 11/2093; G06F 11/3096; G06F 11/3093

USPC ...................................................... 726/22–25

See application file for complete search history.

(56) References Cited

U.S. PATENT DOCUMENTS 7,269,824 B2 * 9/2007 Noy .................... G06F 11/3495 717/130
8,694,983 B1 * 4/2014 Sobel ................. G06F 11/3428 717/169
9,495,236 B2 * 11/2016 Monk ................. G06F 11/3055
10,984,483 B2 4/2021 Cuomo et al.
11,087,299 B2 * 8/2021 Chin ................... G06F 11/0793
11,144,672 B2 10/2021 Vaidhyanathan et al.

(Continued)

FOREIGN PATENT DOCUMENTS

CN 109902919 A 6/2019
CN 112733138 A 4/2021

OTHER PUBLICATIONS

Secureframe , "Readiness Reports", Available online at: https://secureframe.com/features/readiness-reports, Believed to be published at least as early as Sep. 13, 2022, 8 pages.

*Primary Examiner* — Bharat Barot
(74) *Attorney, Agent, or Firm* — Kilpatrick Townsend & Stockton LLP

(57) ABSTRACT

Systems and methods for a server probe to monitor compliance of servers with predetermined baseline metrics including: injecting a server probe script into one or more servers, wherein the server probe script is configured to: scan the one or more servers for operational health data; collect operational health data of the one or more servers; and comparing the operational health data to baseline data associated with a predetermined compliance baseline state for the one or more servers; and identifying based on the comparison, one or more non-compliant servers.

20 Claims, 3 Drawing Sheets

(56) References Cited

U.S. PATENT DOCUMENTS

| | | | | |
|---|---|---|---|---|
| 11,494,183 | B1 | 11/2022 | Smith et al. | |
| 12,199,812 | B2 * | 1/2025 | Pick | H04L 41/16 |
| 2017/0103677 | A1 * | 4/2017 | Bhattacharjee | G06Q 30/02 |
| 2018/0357225 | A1 * | 12/2018 | Liu | H04L 51/02 |
| 2020/0050711 | A1 | 2/2020 | Green et al. | |
| 2023/0188408 | A1 * | 6/2023 | Pick | H04L 41/16 709/224 |

* cited by examiner

SYSTEMS AND METHODS OF A SERVER PROBE FOR COMPLIANCE DEPLOYMENT CHECKS

FIELD OF INVENTION

The present disclosure generally relates to a server probe for identifying compliance of servers with performance and security baselines, and more particularly to systems and methods for a server probe script to alert entities to non-compliant servers.

BACKGROUND

Businesses and other entities concerned with security and performance of servers generally monitor their servers to confirm the servers are operating safely and efficiently. Businesses with multiple high traffic services and large volumes of sensitive data transmissions, such as financial institutions, oftentimes maintain their own server infrastructure. Businesses maintaining servers associated with sensitive data, such as personal identifiable information (PII) or financial transactions, are oftentimes required to maintain servers meeting governmental or institutional requirements for security and efficiency. Current server probes are ill-equipped to monitor and provide solutions to non-compliant servers across multiple operating systems and for multiple services.

SUMMARY

According to certain embodiments, a method for a server probe to monitor compliance of servers with predetermined baseline metrics includes: injecting a server probe script into one or more servers, wherein the server probe script is configured to: scan the one or more servers for operational health data; collect operational health data of the one or more servers; and comparing the operational health data to baseline data associated with a predetermined compliance baseline state for the one or more servers; and identifying based on the comparison, one or more non-compliant servers.

In a further embodiment, the method further includes updating the one or more non-compliant servers to a compliant state.

In an additional embodiment, the server probe script is executed by a processor, the server probe script causes the processor to delete residual code of the server probe script from the one or more servers.

In a further embodiment, the server probe script generates a JSON document of the operational health data.

In another embodiment, operational health data comprises one or more of: information associated with an operating system version of the one or more servers, access settings of the one or more servers, performance metrics of the one or more servers, and an uninstalled patch of the one or more servers.

In a further embodiment, the probe script is injected based on a predetermined server maintenance schedule.

In an additional embodiment, the operational health data is stored by a NoSQL database management application with additional operational health data.

The above methods can be implemented as computer-executable program instructions stored in a non-transitory, tangible computer-readable media and/or operating within a processor or other processing device and memory.

BRIEF DESCRIPTION

A full and enabling disclosure is set forth more particularly in the remainder of the specification. The specification makes reference to the following appended figures.

DETAILED DESCRIPTION

Figure 1:
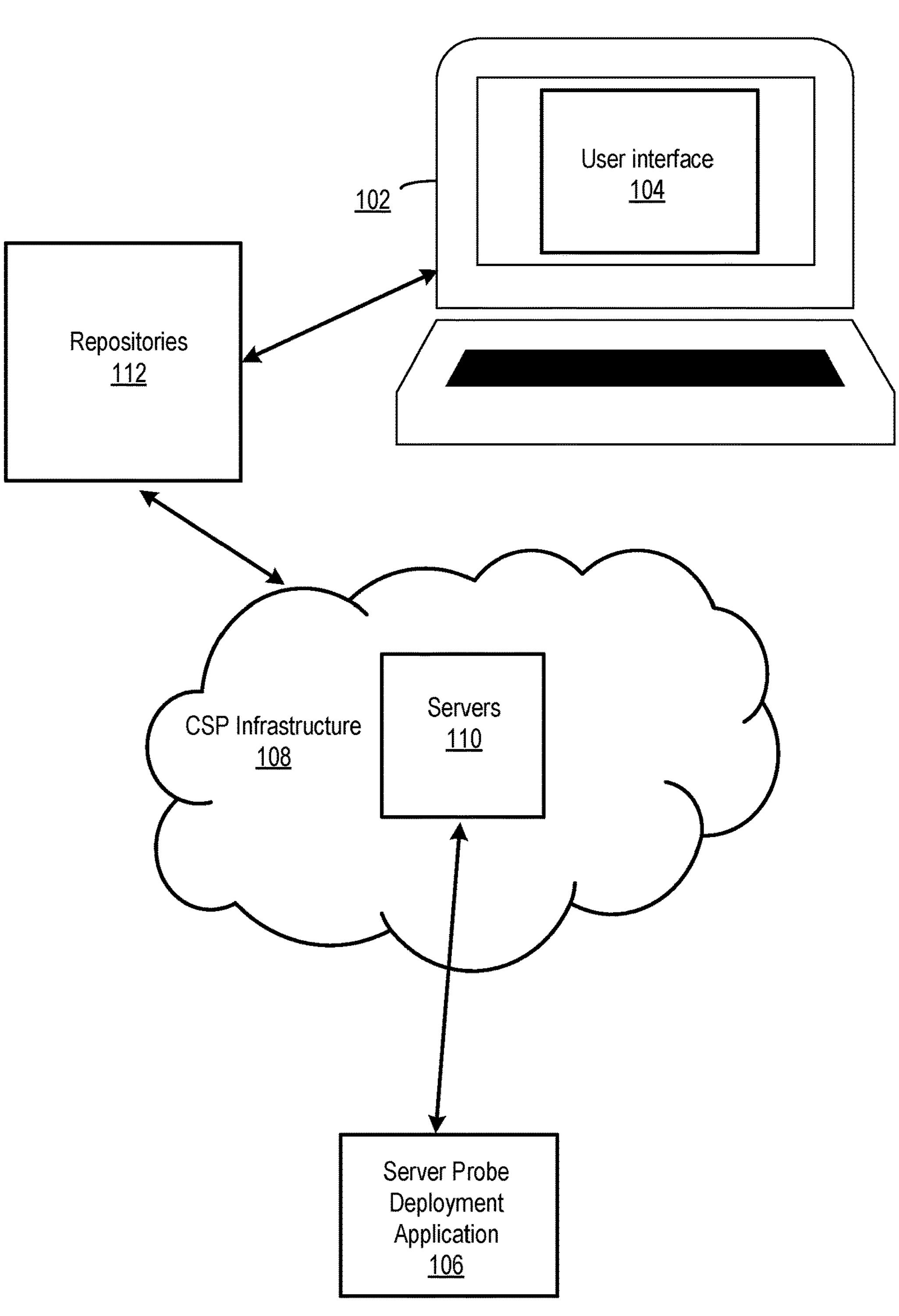
FIG. 1 illustrates an example server probe system.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Embodiment of a Server Probe System

In one illustrative embodiment, a server probe for compliance deployment checks is a computer script that scans for and collects data associated with security of a server and performance metrics associated with the server. For example, the server probe may monitor whether the server is running a correct version of an operating system, whether the server has uninstalled patches, whether the server has appropriate access controls for sensitive data, and whether the server is performing to predetermined performance metrics such as measurements of the server's availability, responsiveness, load, speed, and other issues that may affect operation of the server.

The server probe system may use an application or automation platform that automatically applies the server probe to one or more servers. For example, the system may inject the computer script of the server probe, also referred to as the server probe script, into one or more servers automatically, using automation platforms such as Ansible and HP Server Automation (HPSA). The system may inject the server probe script into one or more servers multiple times, such as by injecting the server probe script into servers periodically, or according to a maintenance schedule. In another example, the system may inject the server probe script a single time, and the server probe script may scan the servers according to a preset schedule (e.g., a predetermined maintenance schedule).

The server probe script may cause the server probe system to execute various operating system utility commands to collect operational health data from a server. Operational health data includes data associated with security of the server and performance metrics associated with the server.

The server probe script may generate a document of the operational health data and call a representational state transfer (REST) application programming interface (API) to transmit the document to a database. The server probe system analyzes the document by comparing the document to baseline data associated with a preset baseline of security and efficiency of the one or more servers. When a server's operational health data is below the preset baseline for performance or security, the server is in a non-compliant state. For example, the operational health data may indicate that a server does not have a recent patch installed that may affect security of the server. The server probe system may identify a difference between patch versions of the server and the baseline data and identify that the patch version of the server is lower than the baseline data.

In further examples, the operational health data of the one or more servers may meet or exceed the baseline data, which indicates the one or more servers are in a compliant state. For example, when the baseline data includes a particular response time of 150 ms, and the one or more servers respond in 100 ms, the servers may be in a compliant state. Servers may be in a compliant state with regards to some operational health data and non-compliant with respect to others. In continuing the example, the one or more servers may also suffer from data loss exceeding a threshold set in the baseline data. The one or more servers may be in a compliant state with response times of the server, but in a non-compliant state in other parts of the operational health data such as in security.

The server system translates the operational health data into a format to be stored in a database with operational health data collected from other servers and displayed through a user interface to a user to convey compliance of the one or more servers with the preset baseline security and efficiency. The user interface may convey what aspects of the one or more servers are in a compliant or non-compliant state, such as when a patch is out of date causing non-compliance in security, but the one or more servers are otherwise operating as expected based on the baseline data (e.g., correct response times, low data loss.).

Example Server Probe System

FIG. 1 illustrates a server probe system 100. The server probe system 100 includes a user device 102, user interface 104, a server probe deployment application 106, cloud service provider infrastructure 108, one or more servers 110, and one or more repositories 112.

As shown in FIG. 1, the server probe deployment application 106 injects a computer script of a server probe into the one or more servers 110. The one or more servers 110 may operate as part of various hardware and software provided by cloud service provider infrastructure 108. The one or more servers may operate using different operating systems, patch versions, and may be associated with different services provided by an entity. For example, one server from the servers 110 may be associated with providing an entity's customer facing website and operate using a first operating system, and another server may be associated with a service provided by the entity and operate using a second operating system. The different servers from the one or more servers 110 may have other operational and technical differences, for example, a server associated with providing a service to users which includes transmitting personal identifiable information (PII) may have more security features enabled, such as various encryption measures to protect sensitive data.

The server probe script scans the server to for operational health data, such as performance metrics indicating the response time of the server and data loss of the server. The server probe collects the scanned data and generates a document associated with the operational health data. The document may be a JavaScript Object Notation (JSON) format.

The server probe system 100 may transmit the document associated with the operational health data to one or more repositories 112, where the server probe system 100 compares the operational health data to baseline data associated with operational requirements of the one or more servers 110. The operational requirements may be set by an entity based on the entity's business rules and practices or may be set based on a governmental or regulatory body regulations for minimum standards of security and efficiency. The baseline data may be specific to a particular server or server type, and servers from the one or more servers 110 may have varying baseline data. For example, a server associated with transmitting PII may have higher security requirements than a server associated with maintaining publicly available information.

A user device 102 may query information from the one or more repositories 112 including: operational health data, baseline data, and results from the comparison of the operational health data and baseline data. The user device 102 may display the queried information through a guided user interface (GUI) such as user interface 104.

Users may provide input to the user interface to adjust the baseline data and direct resources from the entity maintaining the one or more servers 110 to fix hardware or software issues associated with the servers.

Illustrative Operation of a Server Probe System

Figure 2:
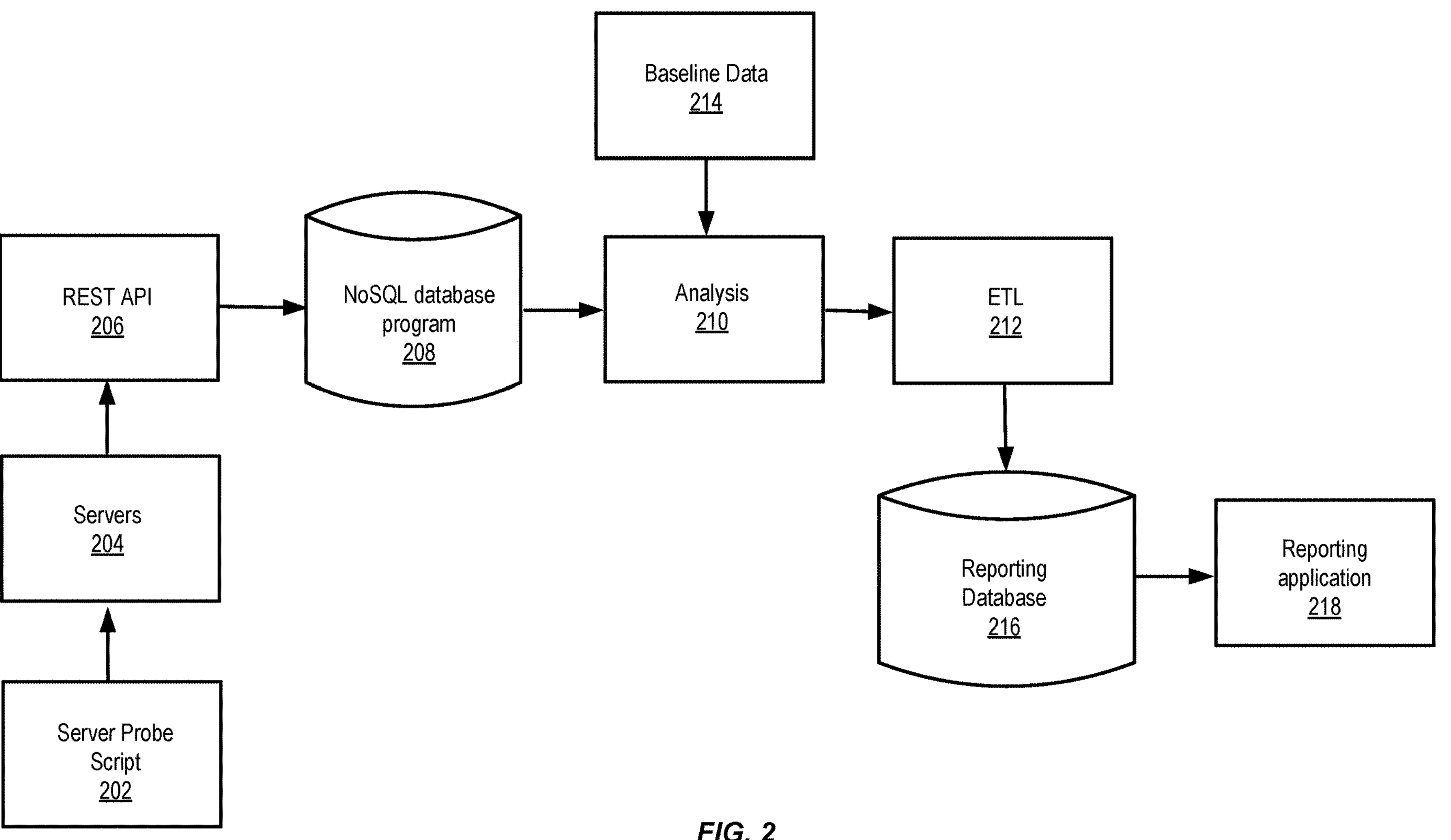
FIG. 2 illustrates an example flow chart of the operation of a server probe system.

FIG. 2 illustrates flow chart 200 of operating a server probe system, such as the server probe system 100 of FIG. 1. In some examples the steps shown in FIG. 2 are performed in a different order or one or more steps may be skipped. Alternatively, in some examples, additional steps not shown in FIG. 2 may be performed.

Block 202 represents the server probe script. The server probe script may be a python script configured to scan servers for operational health data and collect the operational health data. The server probe script may include built in python modules to avoid requiring third-party package dependency which allows the server probe script to be compatible with more servers and server types. In some examples, the probe script may also include a self-cleaning feature. For example, the server probe script may also identify past server probe scripts injected into servers represented at block 204 and delete residual code from past server probe scripts. In other examples, the server probe script may delete itself after it completes its scan and collection of operational health data.

Block 204 represents one or more servers. Block 204 encompasses both the hardware used by an entity to implement the server, and the software used to implement the server, such as a server's operating system and applications executed on the server.

The server probe system, such as the server probe system 100 of FIG. 1, injects the server probe script at block 202 into one or more servers at block 204. Injection may include transmitting the server probe script to one or more servers to cause the one or more servers to execute the server probe script. The server probe system may use various injection methods including active server page (ASP) injections, passing the server probe script through a GET request, or through a command injection on the operating system of the one or more servers. In some examples, the server may query a server probe script from a repository of scripts, and automatically execute the server probe script.

The server probe script may also identify when the script is already present in a server. The server probe script may flag scanned and collected operational health data as duplicative and delete the duplicative data and may cause the server or other computing device to delete duplicate server probe scripts when the server probe script detects a server probe already injected into the server.

Block 206 represents a REST API to receive operational health data, such as the document including the operational health data. The server probe system may use the REST API to transmit the document including operational health data, such as the document in described in FIG. 1, to a database, such as a NoSQL database program shown in block 208.

The NoSQL database program shown in block 208 may be a MongoDB database program or other type of database or database program.

In some examples, other API types may be used such as simple object access protocol (SOAP) APIs.

The NoSQL database may be integrated with the REST API from block 206 to allow flexible document schemas, which may allow the NoSQL database to store and sort documents of various structures generated by the server probe script from block 202. For example, a document generated by a server probe script for a first server with a first operating system may differ in structure, such as the location of elements in the document or terminology, from a document generated by a server probe script for a second server with a second operating system.

The NoSQL database may store operational health data from multiple server probe scripts and generate collections of operational health data. The server probe system may communicate with other applications and systems to provide the collections of operational health data so that users may identify trends server compliance, report server compliance, and fix or update non-compliant servers. Block 218, further described below, represents a reporting application which may, in some embodiments, communicate with the NoSQL database program of block 208.

Block 210 represents a service analysis script executed by the server probe system. The analysis script uses baseline data, represented by block 214, and the operational health data queried from the NoSQL program to determine non-compliant servers and server assets. The baseline data may include minimum parameters for security and efficiency for servers to operate under. The entity operating the server may set the minimum parameters and may adjust the baseline data to reflect changes in the minimum parameters. For example, the baseline data may include a requirement that servers run the newest version of an operating system. Servers with older versions of the operating system would not meet the minimum parameters of the baseline data and would be non-compliant.

Block 212 represents an Extract Transform and Load (ETL) script for transforming data from the NoSQL database program and the results of analysis from block 210 into a format for storing in a reporting database at block 216.

The ETL script may use various data transformation operations such as removing empty fields, removing duplicate information, and updating formats of data to prepare the operational health data and data associated with results from the analysis at block 210 for storage in the reporting database. In some examples, the operational health data and results may already be in the correct format, and the ETL script may not perform transformations.

Block 216 represents a reporting database for storing operational health data transformed by the ETL script. In some examples, the reporting database, at block 216, also stores solutions for non-compliant servers, such as operating system patches and firmware updates.

Block 218 represents a reporting application, which users may use to identify compliant and non-compliant states of the servers. The reporting application may include a user interface which users may interact with to view trends of server compliance, to issue commands to bring servers into compliance, and to receive alerts regarding compliance of servers. In some examples, the reporting database or reporting application may communicate directly with the servers from block 204, and users may select actions at the reporting application to update servers from a non-compliant state to a compliant state.

In other examples, users may use the reporting application to identify non-compliant servers and the nature of the servers' non-compliance. For example, a user may identify that a server does not have the most recent operating system version. The user may determine the non-compliance to be benign, for example if the most recent operating system version did not include improvements to security and may adjust the compliance state of the server without requiring an update to the servers' operating system.

Illustrative Server Probe System Conducting a Compliance Deployment Check

Figure 3:
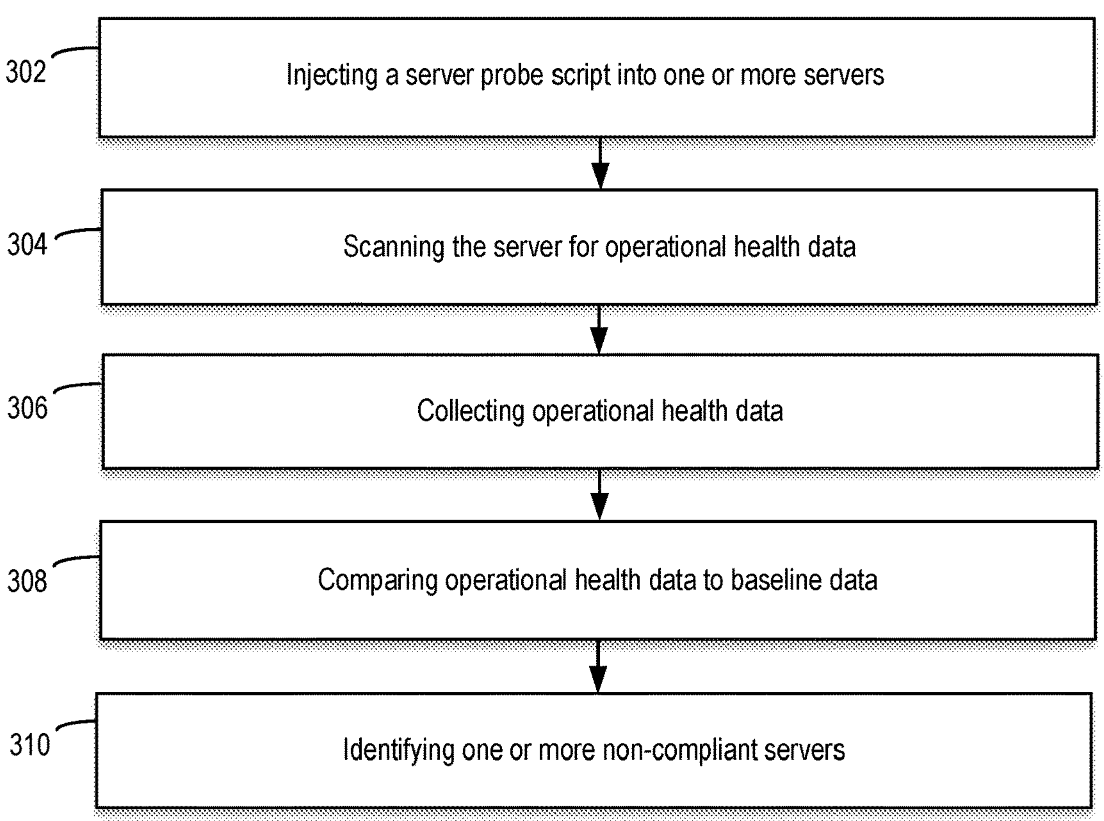
FIG. 3 illustrates an example flow chart for a server probe system conducting a compliance deployment check.

FIG. 3 illustrates an example method 300 executed by a server probe system, such as the server probe system 100 of FIG. 1, of a Compliance Deployment Check. A Compliance Deployment Check is a comparison of operational health data of one or more servers with baseline data set by an entity, such as a business maintaining the servers, to identify aspects or features of the one or more servers that fall within a preset baseline set by an entity for minimum performance of the one or more servers. In some examples the steps shown in FIG. 3 are performed in a different order or one or more steps may be skipped. Alternatively, in some examples, additional steps not shown in FIG. 3 may be performed.

At step 302, the server probe system injects a server probe script into one or more servers. The server probe script may be a python script with built in python modules injected by an automated server maintenance platform such as Ansible as part of a server maintenance schedule. In other examples, a user may cause the server probe script to be injected into the one or more servers outside of a schedule, such as when an entity implements a new server.

At step 304, the server probe system using the server probe script executed on the one or more servers, causes the server, or other device or processor, to scan the server for operational health data. The operational health data may include various settings and aspects of the servers, such as security settings, operating system, patch version, response time of the server, and data loss of the server.

At step 306, the server probe script executed on the one or more servers, causes the server, or other device or processor, to collect the operational health data. For example, the server probe script may cause the server or other device to store the operational health data in an array or other data structure in memory.

The server probe script may collect the operational health data by scraping information from the server, such as security settings, operating system, and patch versions. In some examples, the server probe script may test the server to determine the operational health of the server. For example, the server probe script may test a server's response time by causing the server to send a message to a client and measure the time it takes to receive a response. In other examples, the server probe script may simulate an error or threat to the server to test the server's response. The server probe script executed on the one or more servers, may cause the server, or other device or processor, to generate a document of the collected operational health data. The document may be a JSON document indicating the collected operational health data of the servers, such as the response time of servers, operating system, and patch versions of the servers.

At step 308, the server probe system compares operational health data to baseline data of the server probe system. The baseline data may include an array of values representing minimum security and operational metrics for a server to be in a compliant state. For example, the baseline data may include minimum metrics for how fast the server should respond, the operating system of the server, and the patch version of a server.

In some examples, the server probe system transmits the operational metrics to a database with baseline data and compares the operational metrics at the database. In other examples, a user device may query baseline data from a database of baseline data and query the operational metrics of a server executing the server probe computer script from the server.

At step 310, the server probe system identifies one or more non-compliant servers from the one or more servers that were injected with the server probe script. The servers identified as non-compliant may be flagged by the server probe system for maintenance. In some examples, the server probe system may cause an alert to be generated or sent to a user to warn the user of a non-compliant server. In further examples, the server probe system may generate a maintenance request and place the maintenance request in a queue of work orders for an entity maintaining the servers to execute.

In further examples the server probe system may generate and execute remedial actions to cure non-compliant features and aspects of servers. For example, when a server is non-compliant for using an outdated patch version, the server probe system may automatically transmit a compliant patch version to the server and install the patch to make the server compliant.

Example Advantages of a Compliance Deployment Server Probe

The server probe provides advantages over other monitoring tools because it allows for monitoring of servers associated with different operating systems. The server probe provides end-to-end automated repository management to demonstrate the current state of servers governed by an entity, including information management systems managed and non-information management systems managed server assets. By using a lightweight probing tool injected into servers from a centralized location, and compatible with various server types and operating systems, the The server probe REST API also provides advantages over other monitoring tools. Because the REST API is capable of handling more than one hundred thousand requests a second, the REST API reduces the likelihood that data transmitted between servers and a database program, such as MongoDB, is not missed, allowing for improved accuracy in reporting non-compliant servers.

The REST API may also be built using an open-source REST API framework, such as by using Python EVE so that the API is compatible with both SQL and noSQL database platforms.

The server probe system also allows for easier adjustments to the server probe for a user when he or she determines to change what information to collect. Because the server probe script may be injected from a central location, such as from a central application, and may be self-deleting, users may more easily adjust the server probe script without having to adjust high volumes of servers.

GENERAL CONSIDERATIONS

Although the subject matter has been described in language specific to structural features or methodological acts, it is to be understood that the subject matter of the appended claims is not necessarily limited to the specific features or acts described above. Rather, the specific features and acts described above are disclosed as examples.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

Although the disclosure has been shown and described with respect to one or more implementations, equivalent alterations and modifications will occur based on a reading and understanding of this specification and the drawings. The disclosure includes all such modifications and alterations and is limited only by the scope of the following claims.

What is claimed is:

1. A method comprising:

automatically injecting a server probe script into one or more servers one or more times according to a preset schedule, wherein the server probe script is configured to:

scan the one or more servers for operational health data;

collect operational health data of the one or more servers; and execute instructions to remove the server probe script from the one or more servers after collection of the operational health data; and identifying based on a comparison between the operational health data and baseline data associated with a predetermined compliance baseline state for the one or more servers, one or more non-compliant servers, wherein the comparison comprises an indication that a server of the one or more servers does not have a recent patch installed that affects a security of the server.

2. The method of claim 1, further comprising updating the one or more non-compliant servers to a compliant state.

3. The method of claim 1, wherein the server probe script is further configured to identify and delete residual code of a previous server probe script from the one or more servers.

4. The method of claim 1, wherein server probe script generates a JSON document of the operational health data.

5. The method of claim 1, wherein operational health data further comprises one or more of: information associated with an operating system version of the one or more servers, access settings of the one or more servers, and performance metrics of the one or more servers.

6. The method of claim 1, wherein the preset schedule comprises a predetermined server maintenance schedule.

7. The method of claim 1, wherein the operational health data is stored by a NoSQL database management application with additional operational health data.

8. A system comprising:

one or more processors configured to:

automatically inject a server probe script into one or more servers one or more times according to a preset schedule, wherein the server probe script is configured to:

scan the one or more servers for operational health data;

collect operational health data of the one or more servers; and execute instructions to remove the server probe script from the one or more servers after collection of the operational health data; and identify based on a comparison between the operational health data and baseline data associated with a predetermined compliance baseline state for the one or more servers, one or more non-compliant servers, wherein the comparison comprises an indication that a server of the one or more servers does not have a recent patch installed that affects a security of the server.

9. The system of claim 8, wherein the one or more processors are further configured to update the one or more non-compliant servers to a compliant state.

10. The system of claim 8, wherein the server probe is further configured to identify and delete residual code of a previous server probe script from the one or more servers.

11. The system of claim 8, wherein server probe script generates a JSON document of the operational health data.

12. The system of claim 8, wherein operational health data comprises one or more of: information associated with an operating system version of the one or more servers, access settings of the one or more servers, and performance metrics of the one or more servers.

13. The system of claim 8, wherein the preset schedule comprises a predetermined server maintenance schedule.

14. The system of claim 8, wherein the operational health data is stored by a NoSQL database management application with additional operational health data.

15. A non-transitory computer readable medium comprising instructions that when executed by one or more processors cause the one or more processors to:

automatically inject a server probe script into one or more servers one or more times according to a preset schedule, wherein the server probe script is configured to:

scan the one or more servers for operational health data;

collect operational health data of the one or more servers; and execute instructions to remove the server probe script from the one or more servers after collection of the operational health data; and identify based on a comparison between the operational health data and baseline data associated with a predetermined compliance baseline state for the one or more servers, one or more non-compliant servers, wherein the comparison comprises an indication that a server of the one or more servers does not have a recent patch installed that affects a security of the server.

16. The non-transitory computer readable medium of claim 15, wherein the instructions cause the one or more processors to update the one or more non-compliant servers to a compliant state.

17. The non-transitory computer readable medium of claim 15, wherein the server probe is further configured to identify and delete residual code of a previous server probe script from the one or more servers.

18. The non-transitory computer readable medium of claim 15, wherein operational health data comprises one or more of: information associated with an operating system version of the one or more servers, access settings of the one or more servers, and performance metrics of the one or more servers.

19. The non-transitory computer readable medium of claim 15, wherein the preset schedule comprises a predetermined server maintenance schedule.

20. The non-transitory computer readable medium of claim 15, wherein the operational health data is stored by a NoSQL database management application with additional operational health data.

* * * * *